Sept. 5, 1944.     G. W. HARTWIG     2,357,738
FAMILY MOVIE ALBUM
Filed Dec. 13, 1941     2 Sheets-Sheet 1

INVENTOR
GEORGE W. HARTWIG

BY
ATTORNEYS

Sept. 5, 1944.    G. W. HARTWIG    2,357,738
FAMILY MOVIE ALBUM
Filed Dec. 13, 1941    2 Sheets-Sheet 2

INVENTOR
GEORGE W. HARTWIG

BY

ATTORNEYS

Patented Sept. 5, 1944

2,357,738

UNITED STATES PATENT OFFICE 2,357,738

FAMILY MOVIE ALBUM

George W. Hartwig, Milwaukee, Wis., assignor of one-half to George Neumann, Milwaukee, Wis.

Application December 13, 1941, Serial No. 422,848

1 Claim. (Cl. 88—18.7)

My invention has for its objects to provide a simple, economical and low priced moving picture projector, a portable article particularly for household use, wherein the casing or shell containing the entire equipment is comparatively small in size, whereby it may be conveniently handled by the user to view a series of pictures which are thrown upon a ground glass sheet affixed to the front of the projector casing.

Applicant has in view, in a broad sense, to provide what might be termed a moving picture album, which may be conveniently picked up and put into motion by pressing a button. For example, the individual family pictures may be conveniently viewed from time to time, it being understood that a strip of film carrying the pictures is of the endless belt type whereby said pictures are continuously thrown upon the ground glass sheet.

In view of the fact that this article must be quite compact, it is contemplated to utilize an endless film strip approximately 100 feet in length, although this length may be indefinitely varied. For example, the owner of the article may from time to time produce or have produced for his particular use, a new endless band of pictures which can be readily substituted for the original band. Hence, the family history can from time to time be preserved in a series of endless band moving pictures.

With the above objects in view, my invention consists in certain pecularities of construction and combination of parts as will be hereinafter fully set forth with reference to the accompanying drawings and subsequently claimed.

Figure 1:
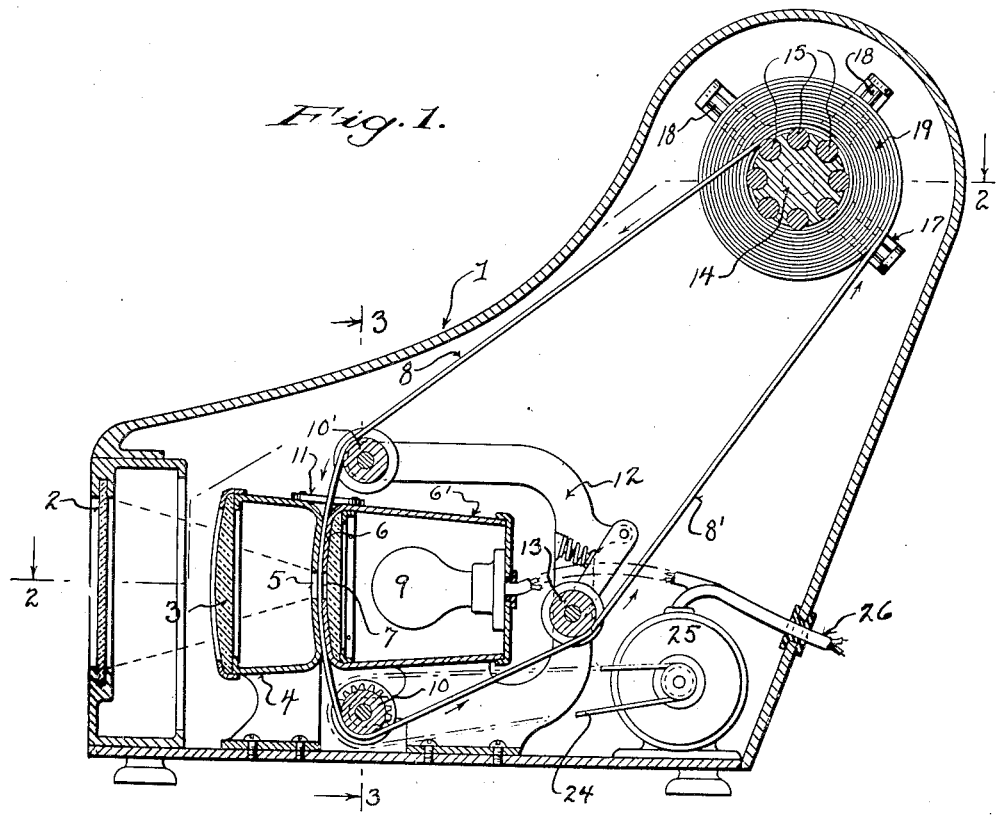
Figure 1 represents a sectional elevation of a portable projector article embodying the features of my invention. The section being indicated by line 1—1 of Figure 2.
Figure 4:
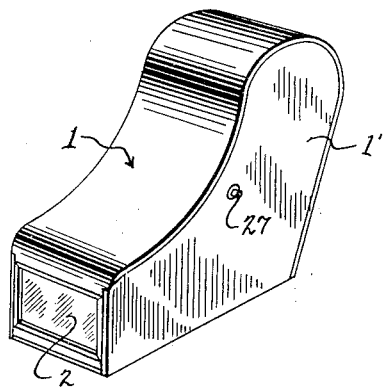
Figure 4 is a perspective view of the device looking towards the front end of same carrying the picture plate.

Referring by characters to the drawings, 1 indicates a casing or housing having a front view opening which is closed by an adjustable ground glass sheet of pre-determined size upon the back face of which the pictures are reflected.

Alined with the picture plate and spaced rearwardly the proper distance therefrom, is a focusing lens 3, carried by a shell 4, secured to the bottom of the casing. The rear wall of the shell 4 is mounted in juxtaposed position to the front wall 6 of a lamp jacket 6', the said front wall being provided with a light aperture 7, which is alined with the light aperture 5, and the slight space between the juxtaposed walls 5 and 6 is adapted to receive the film strip 8, which strip travels through this channel or space at a predetermined speed whereby the pictures thereon are thrown upon the screen or ground plate glass 2, by means of a light bulb 9, which is mounted in the jacket 6'.

The film strip 8, is of the endless type and is guided through the space between the walls of the shell 4 and jacket 6' by flanged rollers 10, 10'.

The film strip, as it passes into the channel between the walls of the jacket and housing, is guided by fingers 11, 11.

The rollers 10 and 10', together with the jacket 6' are mounted upon a bracket 12, secured to the base of the housing, which bracket also carries a spring controlled guide roller 13, for the back-leg 8' of the film strip, whereby slack is taken up therein.

The feed-leg of the film strip is spirally wound upon the core of a fixed reel hub 14 and said first coil is trained over a series of peripheral anti-friction rollers 15, which rollers are carried by the reel core. The reel hub is fixedly secured to a side wall of the casing by a shank 16 and also extending from the hub is a plurality of spider arms 17, which carry anti-friction rollers 18, the same being disposed at a slight angle and adapted to guide the nested coils 19 of the endless film strip.

Figure 2:
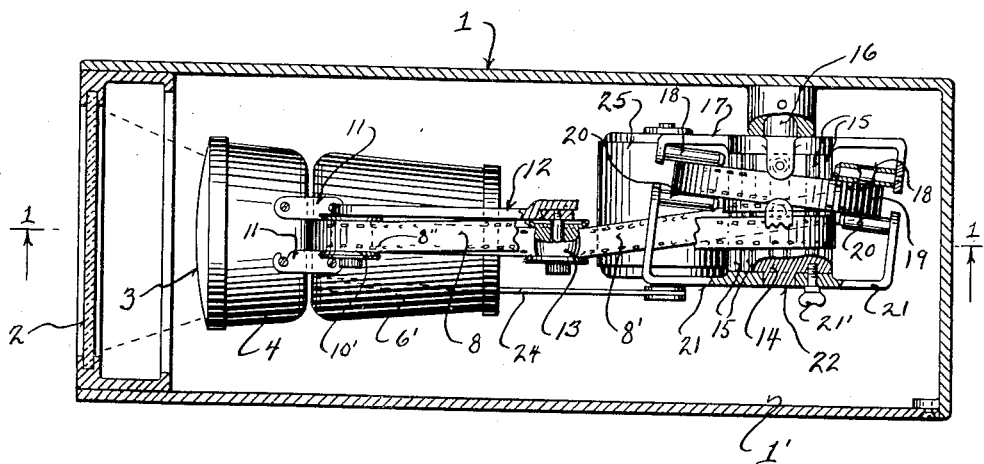
Figure 2 is a plan sectional view of the same, the section being indicated by line 2—2 of Figure 1.

As best shown in Figure 2 of the drawings, the nested coil is disposed at an angle to the axis of the reel core and it is also guided and confined at said angular position by companion rollers 20 carried by a corresponding spider 21, which is detachably mounted upon a head 22 extending from said hub.

In order to remove the coiled endless film strip from the reel hub when it is desired to replace said strip with a new series of pictures, the spider 21 is removed by manipulating the locking bolt 21' and owing to the fact that a side wall 1' of the housing or casing is detachable, these parts can be readily manipulated whereby the new endless film strip is inserted.

Figure 3:
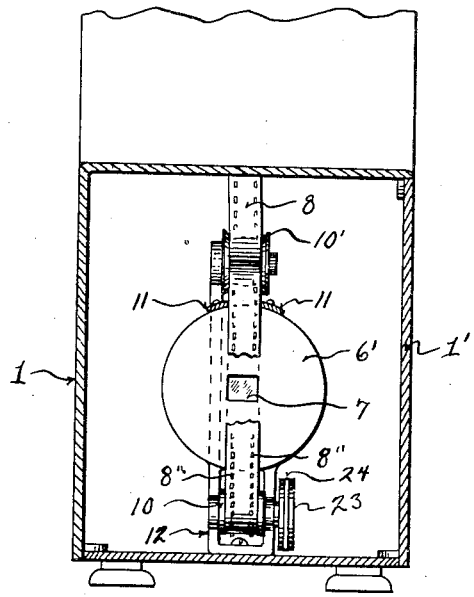
Figure 3 is a cross section of the moving picture casing illustrating the general arrangement of the guides for the film strip and exposure window of the lamp jacket.

As best shown in Figures 1 and 3 of the drawings, the roller 10 is provided with the usual companion sets of teeth for meshed engagement with marginal apertures 8'' of the film strip 8.

The roller 10 also carries a driving pulley 23, adapted to receive an endless driving belt 24, which is trained over a pulley constituting part of an electric motor 25, that is secured to the base of the casing.

It is also apparent that the electric feed wires to the lamp 9, and motor, form a flexible cord 26, which passes through the casing, and an electric switch, not shown, is controlled by a button 27 projecting from the removable side wall 1', of the casing.

From the foregoing description, it will be noted that the feed-leg of the film strip is wound upon the hub reel in a single offset turn and thereafter the coil of winding 19, being angularly offset from the initial winding, will permit this belt of endless film strip to be unwound from the core to form the feed-leg 8 and simultaneously with this unwinding the back-leg of the film strip will be coiled in a compact nest at an angle to the first mentioned single coil, whereby the strip as a whole, irrespective of its length, may be continuously moved past the exposure openings or windows, to reflect a series of magnified pictures upon the transparent sheet 2.

Coincident to this action of the strip, the back-leg 8' will continually form the outer winding of the nested group, which group is held in its angular position by companion guide rollers. Hence, the party desiring to view the pictures will simply pick the light, encased instrument from its point of rest and by pressing the button 27, may casually view the entire group of pictures contained on this strip in the same manner as the pictures in a family album would be viewed.

It is manifest that the motive power may be in the form of a spring or manual rotation and may be imparted by a speeded up core train.

It is understood that the mechanism for controlling the film strip is provided with the usual intermittent feed, and it is also contemplated to adjust the ground glass plate back and forth to vary the distance between the lens 3, and said plate.

While I have shown and described a simple exemplification of my invention minutely as to detail, it is understood that I vary the structural features within the scope of the claim.

I claim:

A reel having an endless film strip comprising a fixed circular hub, rollers embedded in the periphery thereof, front and rear companion spiders extending from the hub ends, companion guide rollers carried by each spider positioned obliquely of the hub axis, means for removably securing the front spider to the hub end, a spirally wound coil of film strip obliquely disposed with reference to the hub and guided by the spider rollers, the inner convolution of the strip extending obliquely from the hub forming a loop with the outer convolution of said coil, whereby the strip is fed from the inner convolution of the coil to the outer convolution of said coil.

GEORGE W. HARTWIG.